(12) United States Patent
Fujita et al.

(10) Patent No.: US 7,923,480 B2
(45) Date of Patent: Apr. 12, 2011

(54) PHOTOCURABLE HYGROSCOPIC COMPOSITION AND ORGANIC EL DEVICE

(75) Inventors: Jun Fujita, Tokyo (JP); Takashi Yamasaki, Sagamiha Kanagawa (JP)

(73) Assignee: 3M Innovative Properties Company, Saint Paul, MN (US)

( * ) Notice: Subject to any disclaimer, the term of this patent is extended or adjusted under 35 U.S.C. 154(b) by 393 days.

(21) Appl. No.: 12/159,885

(22) PCT Filed: Jan. 12, 2007

(86) PCT No.: PCT/US2007/000861
§ 371 (c)(1),
(2), (4) Date: Jul. 2, 2008

(87) PCT Pub. No.: WO2007/084386
PCT Pub. Date: Jul. 26, 2007

(65) Prior Publication Data
US 2009/0045729 A1   Feb. 19, 2009

(30) Foreign Application Priority Data
Jan. 17, 2006  (JP) ................. 2006-008628

(51) Int. Cl.
*C08F 2/50*   (2006.01)
*C08J 3/28*   (2006.01)

(52) U.S. Cl. ................ 522/81; 522/74; 522/77; 522/79; 522/90; 522/96; 522/104; 522/103; 522/100; 522/107; 522/113; 522/114; 522/178; 522/181; 522/154; 252/194; 523/200; 523/300; 313/504; 313/507

(58) Field of Classification Search ................. 522/96, 522/90, 104, 74, 77, 79, 81, 113, 114, 178, 522/181, 154; 252/194; 523/200, 300; 313/504, 313/507
See application file for complete search history.

(56) References Cited

U.S. PATENT DOCUMENTS

| | | | |
|---|---|---|---|
| 5,462,787 A * | 10/1995 | Yamamoto et al. | 428/32.1 |
| 6,226,890 B1 * | 5/2001 | Boroson et al. | 34/472 |
| 6,465,953 B1 | 10/2002 | Duggal | |
| 7,030,258 B2 | 4/2006 | Takahashi et al. | |
| 2002/0015818 A1 | 2/2002 | Takahashi et al. | |
| 2003/0170496 A1 | 9/2003 | Hieda et al. | |
| 2004/0056232 A1 | 3/2004 | Takahashi et al. | |
| 2004/0232833 A1 | 11/2004 | Menda et al. | |
| 2004/0256592 A1 | 12/2004 | Takahashi et al. | |
| 2006/0051549 A1 | 3/2006 | Mano | |

FOREIGN PATENT DOCUMENTS

| | | |
|---|---|---|
| JP | 07-169567 | 7/1995 |
| JP | 09-148066 | 6/1997 |
| JP | 2001-357973 | 12/2001 |
| JP | 2003-142256 | 5/2003 |

* cited by examiner

*Primary Examiner* — Sanza L McClendon

(57) ABSTRACT

A composition usable as a moisture absorbent for an organic electroluminescence device. A photocurable hygroscopic composition comprising (a) a moisture-reactive organic metal compound, (b) a (meth)acrylate, (c) a carboxyl group-containing polymerizable monomer, and (d) a photopolymerization initiator. The proportion of the moisture-reactive organic metal compound (a) is from 5 to 70 wt % based on the entire composition, and the proportion of the carboxyl group-containing polymerizable monomer (c) is from 0.1 to 50 mol % based on the moisture-reactive organic metal compound (a).

8 Claims, 1 Drawing Sheet

PHOTOCURABLE HYGROSCOPIC COMPOSITION AND ORGANIC EL DEVICE

CROSS REFERENCE TO RELATED APPLICATIONS

This application is a national stage filing under 35 U.S.C. 371 of PCT/US2007/000861, filed Jan. 12, 2007, which claims priority to Japanese Application No. 2006-008628, filed Jan. 17, 2006, the disclosure of which is incorporated by reference in its/their entirety herein.

BACKGROUND

The present invention relates to a photocurable hygroscopic composition capable of forming a transparent and flexible hygroscopic layer, and an organic EL element comprising drying means formed of the composition.

An organic EL device utilizing electroluminescence (hereinafter referred to as "EL") of an organic material comprises an organic layer provided by stacking an organic charge transport layer or an organic light-emitting layer between an anode and a cathode and is attracting attention as a light-emitting device enabling high-intensity light emission by low-voltage direct current driving. Also, all materials of the organic EL device can be formed of a solid matter and therefore, this device is promising as a flexible display.

On the other hand, the organic EL device has a problem that when the device is driven for a certain period of time, the light emission characteristics such as light emission intensity, light emission efficiency and light emission uniformity seriously deteriorate as compared with those at the initial stage. The cause of this deterioration in the light emission characteristics is, for example, oxidation of the electrode due to oxygen intruded into the organic EL device, oxidative decomposition of the organic material due to generation of heat at the driving, oxidation of the electrode due to free water in air intruded into the organic EL device, or denaturation of the organic material. Furthermore, for example, interfacial separation of the structure by the effect of oxygen or free water, generation of heat at the driving, or high temperature in the environment at the driving may trigger the generation of a stress at the interface of the structure due to difference in the thermal expansion coefficient between respective constituent elements, and the resulting mechanical deterioration of the structure, such as interfacial separation, may also give rise to the deterioration of light emission characteristics.

In order to prevent these problems, a large number of techniques of encapsulating the organic EL device and thereby inhibiting contact with free water or oxygen are being studied. For example, there has been disclosed a method where, as shown in FIG. 1, a sealing cap 2 having laminated on the inner wall thereof a water absorbent 6 is placed on a picture element area formed by arraying an organic EL device comprising a substrate 1 having thereon a transparent electrode 3, an organic functional layer 4 and a metal cathode electrode 5 and after filling the inside with a nitrogen gas, fixed to the substrate 1 with an adhesive 7, thereby preventing free water from reaching the organic EL device (see, for example, Japanese Unexamined Patent Publication (Kokai) No. 9-148066). Also, a method of reducing the effect of oxygen by using an oxygen absorbent in place of the water absorbent has been disclosed (see, for example, Kokai No. 7-169567).

As for the water absorbent, various substances have been investigated and among these, an alkaline earth metal oxide such as barium oxide (BaO) and calcium oxide (CaO) is being widely studied because, unlike other water absorbents such as silica gel and zeolite of physically adsorbing water, a water molecule can be unfailingly captured by a chemical reaction and release of a water molecule at a high temperature does not occur.

However, such a water absorbent is an inorganic compound particle and requires a concave substrate for its attachment in a device, and this disadvantageously gives rise to increase in the thickness of the device. Furthermore, the alkaline earth metal oxide is opaque and may be applied to a so-called bottom emission-type display device of taking out the display light from the substrate 1 side, but in the case of application to a so-called top emission-type display device of taking out the display light from the sealing cap 2 side opposite the substrate 1, the emission of display light is inhibited by the water absorbent 4 and therefore, the water absorbent 4 must be disposed not to cover the picture element area, which imposes a limitation that the site for the placement must be newly provided.

For applying a water absorbent to such a top emission-type display device, several proposals have been made. For example, it may be easily thought to apply a transparent water-absorptive polymer such as polyvinyl alcohol and nylon as the water absorbent. However, these polymers physically adsorb water and their water absorptivity is not sufficiently high. Also, a technique of disposing a particulate water absorbent in an organic EL device of top-emission structure to an extent of not inhibiting the optical transparency (see, Kokai No. 2001-357973), and a technique of using a plastic substrate having dispersed therein a water absorbent having a particle diameter smaller than the light emission wavelength of the organic EL device (see, for example, Kokai No. 2002-56970), have been proposed. However, in either case, the water absorbent used is an inorganic particle and has a difficulty in the method for placement and also, reduction in the transmittance due to light scattering is inevitably caused because uniform dispersion to a primary particle is difficult.

In order to solve these problems, use of a water catching film having small visible light absorption has been disclosed (see, Kokai No. 2003-142256). The water catching film can be formed by solvent-coating a special metal compound and has sufficiently high transparency. However, this water catching film comprises a low molecular compound and therefore, disadvantageously lacks flexibility in the case of application to a flexible substrate.

On the other hand, the encapsulation process of an organic EL device is performed in an extremely dried glove box so as to prevent intrusion of free water and considering this point, a solventless type not using a solvent is preferred in view of safety and environment. However, the conventional water catching film is a solvent-coating type as described above, and a solventless type is demanded. As a solventless type water catching film, a film consisting of a mixture of a cyclic aluminum compound having radical polymerizable group and acrylic monomer has been disclosed (see, Kokai No. 2005-7235). However, this film has no flexibility and transparency.

SUMMARY

Embodiments of the present invention include photocurable hygroscopic compositions.

DETAILED DESCRIPTION

Figure 1:
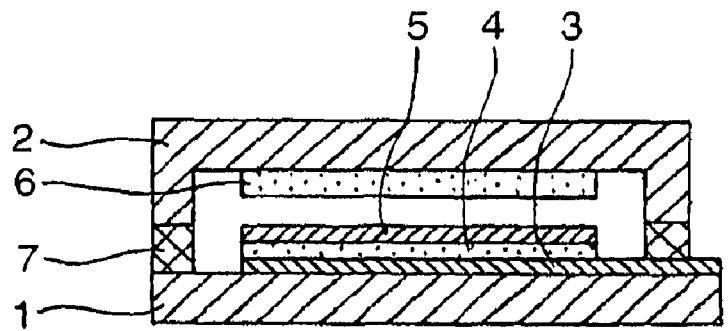
FIG. 1 is a cross-sectional view schematically showing the structure of an organic EL device according to the present invention and a conventional technique.

The present invention has been made to solve those problems identified above by providing a solventless-type composition which can be used as a scavenger for free water and/or oxygen of a device susceptible to free water or oxygen, such as organic EL device, and which is transparent to allow for placement on the light-emitting surface side without intercepting light and furthermore, flexible to enable the application also to a flexible substrate; and an organic EL device capable of maintaining the light emission characteristics over a long period of time.

In order to attain the above-described feature, according to the present invention, a photocurable hygroscopic composition is provided, comprising:
(a) a moisture-reactive organic metal compound,
(b) a (meth)acrylate,
(c) a carboxyl group-containing polymerizable monomer, and
(d) a photopolymerization initiator,
wherein the proportion of the moisture-reactive organic metal compound (a) is from 5 to 70 wt % based on the entire composition, and the proportion of the carboxyl group-containing polymerizable monomer (c) is from 0.1 to 50 mol % based on the moisture-reactive organic metal compound (a).

Also, according to the present invention, a hygroscopic film formed by shaping the above-described photocurable hygroscopic composition into a film form, and curing the film, is provided.

Furthermore, according to the present invention, an organic EL device is provided, comprising a stacked body obtained by interposing an organic light-emitting material layer comprising an organic material between a pair of electrodes opposing each other, structure of sealing the stacked body from the outer air, and drying means disposed in the structure, wherein the drying means is formed of the above-described photocurable hygroscopic composition.

The composition of the present invention comprises an organic metal compound capable of reacting with free water and a (meth)acrylate having transparency and flexibility, and can be used as a water scavenger for a device susceptible to free water, such as organic EL device. The film formed of this composition is transparent and therefore, can be disposed on the light-emitting surface of a light-emitting device to produce a stacked body, and this film also has flexibility and therefore, is usable for a flexible display. Furthermore, the composition is a solventless type and therefore, is preferred in view of safety and environment. The organic EL device of the present invention fabricated by disposing this composition as a water scavenger is assured of suppressed deterioration due to free water or oxygen and can maintain the light emission characteristics over a long period of time.

As described above, the photocurable hygroscopic composition of the present invention comprises (a) a moisture-reactive organic metal compound, (b) a (meth)acrylate, (c) a carboxyl group-containing polymerizable monomer, and (d) a photopolymerization initiator. In the present specification, the term "(meth)acryl" means acryl or methacryl.

The moisture-reactive organic metal compound (a) is a compound capable of reacting with water and removing the free water by a chemical reaction. The moisture-reactive organic metal compound (a) is preferably a metal alkoxide represented by the following formula:

$$M(OR)_n$$

wherein M is Al, B, Ti or Zr, R is an alkyl group, an alkenyl group, an aryl group, a cycloalkyl group, a heterocyclic group or an acyl group, and n is the valence of M. Such a metal alkoxide is usually present in the form of a multimer.

This metal alkoxide can chemically trap water by reacting with water according to the following formula:

$$M(OR)_n + xH_2O \rightarrow M(OH)_x(OR)_{n-x} + xROH$$

As shown by the formula above, the metal alkoxide reacts with water to produce an alcohol ROH, and R in the metal alkoxide is preferably a group of giving an alcohol ROH having a boiling point of 160° C. or more, more preferably 180° C. or more. If the boiling point is less than 160° C., the alcohol may foam due to local generation of heat during running of an organic EL device or the evaporated compound may aggregate on the device and when a passivation film or the like is not provided, dissolve an organic compound or permeate into the interface between an organic compound and an electrode to attack the device.

Examples of the OR group include an alkoxyl group such as n-octyloxy group, 2-ethylhexyloxy group, decyloxy group, lauryloxy, group, myristyloxy group, cetyloxy group, isostearyloxy group and 2-octyldodecyloxy group, an alicyclic alkoxyl group such as borneoxy group, isoborneoxy group and cholesteroxy group, an aromatic ring-containing alkoxyl group such as phenylethyloxy group, phenylpropyloxy group and phenoxyethyloxy group, a phenoxy group such as tert-butylphenoxy group and 4-(1,1,3,3-tetramethylbutyl)phenoxy group, a polyoxyalkylene monoalkyl ester- or monoether-oxy group such as polyoxyethylene monolauryl esteroxy group, polyoxyethylene monomethyl etheroxy group, polyoxypropylene monobutyl etheroxy group and polytetrahydrofuran monomethyl etheroxy group, a polydimethylsiloxane skeleton-containing alkoxy group, and a nitrogen-containing alkoxyl group such as 2-pyrrolidone-1-ethyl-2-oxy group and morpholinoethoxy group, The proportion of the moisture-reactive organic metal compound (a) blended is from 5 to 70 wt % based on the entire composition. If the proportion blended exceeds 70 wt %, the film or membrane formed of this composition is not satisfied in the strength or migration of a reaction product after moisture absorption readily occurs, whereas if it is less than 5 wt %, satisfactory moisture absorptivity may not be brought out.

The (meth)acrylate is a compound having a (meth)acryloyl group in the molecule. By virtue of use of this (meth)acrylate, a thin film can be formed by the photocuring through compatibilization with the moisture-reactive organic metal compound, and transparency can be maintained even after moisture absorption. As for the (meth)acrylate, either one or both of a mono(meth)acrylate and a polyfunctional (meth)acrylate can be used. The (meth)acrylate preferably has a boiling point of 160° C. or more, more preferably 180° C. or more. If the boiling point is less than 160° C., the (meth)acrylate slightly remaining in the photocured film may foam due to local generation of heat during running of an organic EL device, or the evaporated compound may aggregate on the device and when a passivation film or the like is not provided, dissolve an organic compound or permeate into the interface between an organic compound and an electrode to attack the device.

Examples of the mono(meth)acrylate include an alkyl (meth)acrylate such as 2-ethylhexyl(meth)acrylate, n-octyl (meth)acrylate, lauryl(meth)acrylate, stearyl (meth)acrylate, isobornyl(meth)acrylate and dicyclopentanyl(meth)acrylate, an alkylene (meth)acrylate such as phenoxyethyl(meth)acrylate, polyethylene glycol(meth)acrylate and polypropylene glycol(meth)acrylate, and an acrylamide such as N,N-dimethylamino(meth)acrylate, acryloyl morpholine, N-pyrrolidone, N,N-dimethylacrylamide and N-(2-hydroxyethyl) acrylamide.

The polyfunctional(meth)acrylate may be added so as to enhance the strength of the cured product, and examples thereof include an alkyl di(meth)acrylate such as hexanediol di(meth)acrylate, nonanediol di(meth)acrylate and tricyclodecanedimethanol di(meth)acrylate, a polyether (meth)acrylate such as polyethylene glycol di(meth)acrylate and polypropylene glycol di(meth)acrylate, a silicone di(meth) acrylate such as SILAPLANE FM7711, FM7721 and FM7725 (Chisso Corp.), and an oligo(meth)acrylate such as epoxy(meth)acrylate and urethane (meth)acrylate.

Among these, urethane(meth)acrylate and epoxy(meth) acrylate are preferred in view of flexibility and transparency of the cured product obtained. Examples of the epoxy (meth) acrylate include BLEMMER PDBE-1300 and BLEMMER 85PDPE-1500B produced by NOF Corp.; NK Oligo EA Series produced by Shin-Nakamura Chemical Co., Ltd.; and KAYARAD R Series produced by Nippon Kayaku Co., Ltd. Examples of the urethane(meth)acrylate include BLEMMER DA Series and BLEMMER DP Series produced by NOF Corp.; NK Oligo U Series and NK Oligo UA Series produced by Shin-Nakamura Chemical Co., Ltd.; ARONIX M1000 Series produced by TOAGOSEI Co., Ltd.; KAYARAD UX3000, 4000 and 6000 Series; BEAMSET 500 Series produced by Arakawa Chemical Ind., Ltd.; SHIKOH UV Series produced by The Nippon Synthetic Chemical Industry Co., Ltd.; Ebecryl Series produced by Daicel UCB; Art Resin UN Series produced by Negami Chemical Ind., Co., Ltd.; DIABEAM UK Series produced by Mitsubishi Rayon Co., Ltd.; and TEAI 1000 produced by Nippon Soda Co., Ltd.

The amount of the polyfunctional (meth)acrylate blended is such an amount that the (meth)acryloyl group in this (meth) acrylate occupies 0.05 mol or less per 100 g of the entire composition. If the proportion exceeds 0.05 mol %, an excessively high crosslinking density results after photocrosslinking and therefore, migration of a reaction product after moisture absorption readily occurs.

The carboxyl group-containing polymerizable monomer partially reacts with the moisture-reactive organic metal compound to form a part of a polymer by photopolymerization and does not cause phase separation. Examples of the carboxyl group-containing polymerizable monomer include an acrylic acid, a methacrylic acid, a (meth)acryloylethyl phthalate, a (meth)acryloylethyl hexahydrophthalate, an ethylene oxide-modified succinic acid (meth)acrylate and a β-carboxyethyl(meth)acrylate. Among these, an acrylic acid is preferred.

The amount of the carboxyl group-containing polymerizable monomer blended is preferably from 0.1 to 50 mol %, preferably from 1 to 20 mol %, based on the moisture-reactive organic metal compound. If the proportion is less than 0.1 mol %, the compound produced after moisture absorption may aggregate to deprive the cured product of the transparency, whereas if it exceeds 50 mol %, the moisture absorptivity decreases.

As for the photopolymerization initiator, examples thereof include, but are not limited to, acetophenone, diethoxyacetophenone, 2-methyl-1-[4-(methylthio)phenyl]-2-morpholinopropane-1, benzoin, benzoin ethyl ether, benzyl dimethyl ketal, benzophenone, benzylmethyl benzoylformate, 2-ethylanthraquinone, thioxanthone, diethylthioxanthone, 2,4,6-trimethylbenzoyldiphenylphosphine oxide (Lucirin TPO, trade name, produced by BASF), 2,4,6-trimethylbenzoylphenylethoxyphosphine oxide (Lucirin TPO-L, trade name, produced by BASF), bis(2,4,6-trimethylbenzoyl)phenylphosphine oxide (IRGACURE 819, produced by Ciba-Geigy), 2-hydroxy-2-methyl-1-phenylpropan-1-one (DAROCURE 1173, trade name, produced by Ciba-Geigy), 4-(2-hydroxyethoxy)phenyl-(2-hydroxy-2-propyl)ketone (IRGACURE 2959, trade name, produced by Ciba-Geigy), 4-(2-acryloyloxyethoxy)phenyl-(2-hydroxy-2-propyl)ketone, 1-hydroxycyclohexyl-phenyl ketone (IRGACURE 184, trade name, produced by Ciba-Geigy), 1-(4-isopropylphenyl)-2-hydroxy-2-methylpropan-1-one, 1-(4-dodecylphenyl)-2-hydroxy-2-methylpropan-1-one, 2-methyl-2-morpholino(4-thiomethylphenyl)propan-1-one (IRGACURE 907, trade name, produced by Ciba-Geigy), 2-benzyl-2-dimethylamino-1-(4-morpholinophenyl)-butanone (IRGACURE 369, trade name, produced by Ciba-Geigy), 2-hydroxy-2-methyl-1-[4-(1-methylvinyl)phenyl]propane oligomer [ESACURE KIP 150, trade name, produced by Lamberti), N,N'-octamethylene bisacridine (ADEKA OPTOMER N 1717, trade name), and acryloylbenzophenone (Ebercryl P36, trade name, produced by Daicel UCB). The photopolymerization initiator is preferably added in an amount of 0.1 to 5 wt % based on the composition.

The composition of the present invention may also contain various additives such as filler and stabilizer. The filler is preferably an inorganic filler containing a hydroxyl group capable of reacting with the above-described metal compound, and examples thereof include a metal oxide such as silica, titanium oxide, zinc oxide, aluminum oxide and zirconium oxide; a nitride such as boron nitride and aluminum nitride; clays such as montmorillonite; carbon black; and a material obtained by surface-treating these substances with a silane coupling agent or the like. Examples of the stabilizer of the moisture-reactive organic metal compound include amines such as imidazole, pyridine, diazabicyclooctane and triethanolamine.

The film formed of the composition of the present invention is transparent and therefore, can be used for various optical devices and the like. That is, a second embodiment of the present invention is a hygroscopic film formed of the composition of the present invention. This film can be formed by a normal method, for example, a method of coating the composition on a substrate and curing it by irradiating light such as ultraviolet ray.

Figure 2:
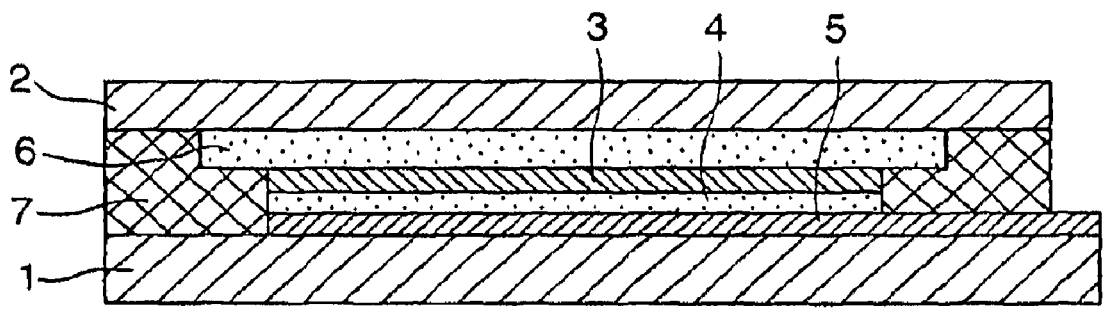
FIG. 2 is a cross-sectional view schematically showing the structure of the organic EL device of the present invention.
Figure 3:
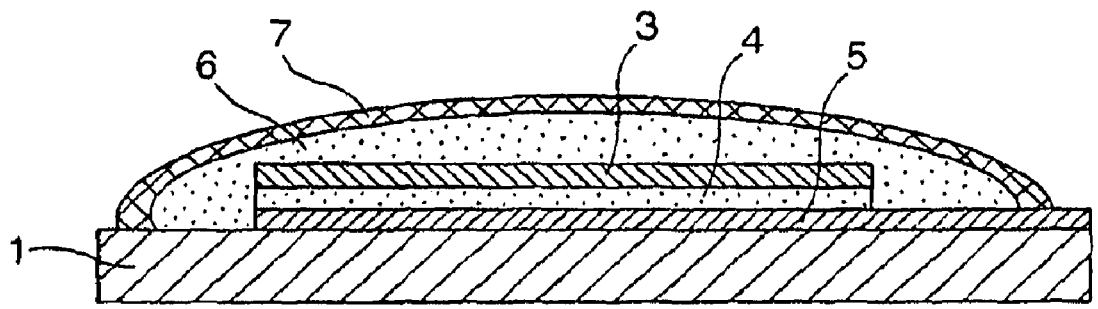
FIG. 3 is a cross-sectional view schematically showing the structure of the organic EL device of the present invention.

A third embodiment of the present invention is an organic EL device having disposed in the inside thereof drying means formed of the composition of the present invention. The organic EL device may take the same constitution as that of a conventional organic EL device shown in FIG. 1. That is, the organic EL device comprises a stacked body provided by interposing an organic functional layer 4 comprising an organic material between a pair of electrodes 3 and 5 opposing each other, container 2 housing and sealing the stacked body from the outer air, and drying means 6 disposed in the container. The drying means is a hygroscopic film formed of the above-described composition. This film is transparent and therefore, the drying means 6 is not limited in the position for its placement and, as shown in FIG. 2, may be directly laminated as a film 6 to cover the electrode 3. Alternatively, as shown in FIG. 3, after disposing the film 6 to cover the entirety of the electrodes 3 and 5 and the organic functional layer 4 on the substrate 1, an adhesive 7 may be further covered thereon. Although not shown, a passivation film may be also formed on the electrodes 3 and 5.

EXAMPLES

Preparation of Moisture-Reactive Organic Metal Compound

A polyoxyethylene monomethyl ether having a hydroxyl group at one end (Mw: 350, produced by Sigma Aldrich) (30 g) was charged into a nitrogen-purged 100 mL-volume Schlenk tube and water-cooled, and 28.6 g of a hexane solution of ethyl aluminum was gradually added thereto. After the generation of an ethane gas was completed, the temperature was returned to room temperature and stirring was continued for 24 hours. Subsequently, the solvent was removed by distillation under reduced pressure to obtain Moisture-Reactive Organic Metal Compound 1 (tris(polyoxyethyleneoxy)aluminum). Also, Moisture-Reactive Organic Metal Compounds 2 (tris(polyoxyethyleneoxy)aluminum), 3 (tris(polydimethylsiloxanepropoxyethoxy)aluminum), 4 (tris(octadodecyloxy)aluminum) and 5 (tris(2-pyrrolidone-1-ethyl-2-oxy)aluminum) were obtained by using tripropylene glycol ether (Mw: 287, produced by Sigma Aldrich), polydimethylsiloxanepropoxyethanol (SILAPLANE FM0411, produced by Chisso Corp.), octadodecanol (produced by Kao Corp.) and 1-(hydroxyethyl-2-pyrrolidone (produced by Tokyo Kasei Kogyo Co., Ltd.), respectively, in place of the polyoxyethylene monomethyl ether.

Example 1

Preparation of Photocurable Hygroscopic Composition

Using 8.0 g of polyoxyethylene monomethyl ether acrylate (AM90G, produced by Shin-Nakamura Chemical Co., Ltd.) and 2.0 g of polyoxyethylene diacrylate (A-600, produced by Shin-Nakamura Chemical Co., Ltd.) as the (meth)acrylate, these were charged into a nitrogen-purged 30 mL-volume tube. Subsequently, Moisture-Reactive Organic Metal Compound 1 (10 g) prepared above was gradually added and stirred. Furthermore, 0.1 g of photoinitiator (DAROCURE 1173, produced by Ciba-Geigy) and 0.1 g of acrylic acid (produced by Wako Pure Chemical Ind., Ltd.) as the carboxyl group-containing polymerizable monomer were added and stirred until the system became uniform, whereby Photocurable Hygroscopic Composition 1 was obtained.

Production of Hygroscopic Film

Photocurable Hygroscopic Composition 1 obtained above was laminated with a polyethylene terephthalate (PET) film (Lumirror T-60, produced by Toray Ind., Inc., thickness: 50 μm) and a silicone release-treated PET film (SP-PET-01, 50 BU, produced by Panac Co., thickness: 50 μm), and passed through a knife gap to form a film. Thereafter, an ultraviolet ray of 1,000 mJ/cm$^2$ was irradiated on this film by using an ultraviolet irradiating apparatus (UVC183, manufactured by Ushio Inc.) to obtain a hygroscopic film having a total thickness of 150 μm.

Examples 2 to 8

Photocurable Hygroscopic Compositions 2 to 8 were prepared in the same manner as in Example 1 by using the materials shown in Table 1, and hygroscopic films were produced by using these compositions.

Comparative Example 1

The film production was performed in the same manner as in Example 1 except for changing the ratio between monoacrylate and diacrylate.

Comparative Example 2

The film production was performed in the same manner as in Example 4 except for not adding an acrylic acid.

Comparative Example 3

A calcium oxide powder was used as the hygroscopic compound.

TABLE 1

| Composition | Example | | | | | | | | Comparative Example | |
|---|---|---|---|---|---|---|---|---|---|---|
| | 1 A-1 | 2 A-2 | 3 A-3 | 4 A-4 | 5 A-5 | 6 A-6 | 7 A-7 | 8 A-8 | 1 B-1 | 2 B-2 |
| Monoacrylate 1 | 40 | 40 | 40 | | | | | | 10 | |
| Monoacrylate 2 | | | | 90 | 40 | | | | | 90 |
| Monoacrylate 3 | | | | | | | 30 | | | |
| Monoacrylate 4 | | | | | | | | 60 | | |
| Diacrylate 1 | 10 | | | | | | | | 40 | |
| Diacrylate 2 | | 10 | | | | | | | | |
| Diacrylate 3 | | | 10 | | | | | 10 | | |
| Diacrylate 4 | | | | 10 | | | | | | 10 |
| Diacrylate 5 | | | | | 10 | | | | | |
| Diacrylate 6 | | | | | | 40 | | | | |
| Diacrylate 7 | | | | | | | 30 | | | |
| Moisture-Reactive Organic Metal Compound 1 | 50 | 50 | 50 | | | | | | 50 | |
| Moisture-Reactive Organic Metal Compound 2 | | | | | 50 | 50 | | | | 50 |
| Moisture-Reactive Organic Metal Compound 3 | | | | | | | 60 | | | |
| Moisture-Reactive Organic Metal Compound 4 | | | | | | | | 40 | | |

TABLE 1-continued

|  | Example | | | | | | | | Comparative Example | |
| --- | --- | --- | --- | --- | --- | --- | --- | --- | --- | --- |
| | 1 | 2 | 3 | 4 | 5 | 6 | 7 | 8 | 1 | 2 |
| Composition | A-1 | A-2 | A-3 | A-4 | A-5 | A-6 | A-7 | A-8 | B-1 | B-2 |
| Moisture-Reactive Organic Metal Compound 5 | | | | | | | | 30 | | |
| Photo initiator 1 | 1 | 1 | 1 | 1 | 2 | 1 | | | 1 | 1 |
| Photo initiator 2 | | | | | | | 1 | 1 | | |
| Acrylic Acid | 0.5 | 0.5 | 0.5 | 0.5 | 0.5 | 0.3 | 0.4 | 0.4 | 0.5 | 0 |

The compounds in Table 1 indicate the following compounds.
Monoacrylate 1: Polyoxyethylene monomethyl ether acrylate (AM90G, produced by Shin-Nakamura Chemical Co., Ltd.)
Monoacrylate 2: Polyoxypropylene acrylate (AP800, produced by NOF Corp.)
Monoacrylate 3: Isobornyl acrylate (IBX-A, produced by Kyoeisha Chemical Co., Ltd.)
Monoacrylate 4: Phenoxyethyl acrylate (Viscoat #192, produced by Osaka Organic Chemical Ind., Ltd.)
Diacrylate 1: Polyoxyethylene diacrylate (A600, produced by Shin-Nakamura Chemical Co., Ltd.)
Diacrylate 2: Bis-A-30EO dimethacrylate (BLEMMER PDBE-1300, produced by NOF Corp.)
Diacrylate 3: Poly(EO)diacrylate (BLEMMER DA-800AU, produced by NOF Corp.)
Diacrylate 4: Polyoxypropylene diacrylate (APG700, produced by Shin-Nakamura Chemical Co., Ltd.)
Diacrylate 5: Poly(PO)diacrylate (BLEMMER DA-800, produced by NOF Corp.)
Diacrylate 6: Silicone dimethacrylate (SILAPLANE FM7725, produced by Chisso Corp.)
Diacrylate 7: Hydrogenated polybutadiene diacrylate (TEAI 1000, produced by Nippon Soda Co., Ltd.)
Photopolymerization Initiator 1: Darocure 1173, produced by Ciba-Geigy
Photopolymerization Initiator 2: Irgacure 651, produced by Ciba-Geigy Measurement of Physical Properties The hygroscopicity, transmittance and flexibility of each of the obtained hygroscopic films were measured as follows.

Hygroscopicity

The hygroscopic film was cut into a 30 mm×40 mm square and immediately after stripping the silicone release-treated PET film, placed in a 400 mL-volume stainless steel vessel equipped with a thermohygrometer, and the vessel was closed by a metal-made cover. The time until the relative humidity in this stainless steel vessel decreased by 10% was measured. The measurement results are shown in Table 2.

Transmittance

The transmittance was measured by using Spectrophotometer U-4100 manufactured by Hitachi Ltd. As for the sample for measurement, the 50 µm-thick film with PET produced above was left standing at a temperature of 25° C. for 3 days in an air having a relative humidity of 50%, thereby allowing for thorough moisture absorption, was used. In the analysis, the PET film was used as the base line. The minimum transmittance in a wavelength region of 400 to 800 nm is shown in Table 2.

Flexibility

The film used above was bent along an iron bar (R=10 mm) and observed with an eye. This operation was repeated 10 times, but in the case of the film of Example 1, generation of cracks on the surface was not observed at all.

TABLE 2

| | Composition | (Meth)acryloyl group/composition (mol/100 g) | Time to 10% decrease | Transparency | Bending times |
| --- | --- | --- | --- | --- | --- |
| Example 1 | A-1 | 0.014 | 40 sec | 89% | >10 |
| 2 | A-2 | 0.011 | 50 sec | 87% | >10 |
| 3 | A-3 | 0.012 | 90 sec | 88% | >10 |
| 4 | A-4 | 0.008 | 90 sec | 87% | >10 |
| 5 | A-5 | 0.012 | 60 sec | 87% | >10 |
| 6 | A-6 | 0.004 | 420 sec | 89% | >10 |
| 7 | A-7 | 0.025 | 120 sec | 88% | >10 |
| 8 | A-8 | 0.008 | 50 sec | 88% | >10 |
| Comparative Example 1 | B-1 | 0.055 | 40 sec | Migration | >10 |
| 2 | B-2 | 0.012 | 110 sec | Hazy | >10 |
| 3 | B-3 | — | 480 sec | Opaque | — |

As apparent from the results shown in Table 2, the films formed of respective compositions of Examples 1 to 8 have sufficiently high moisture reactivity, are usable as a water scavenger, and exhibit satisfactory flexibility. Furthermore, these films have sufficiently high transparency in the visible light region. On the other hand, the film formed of the composition of Comparative Example 1 exhibited sufficiently high transparency after photocuring but when moisture was absorbed, the alcohol produced by hydrolysis migrated to the film surface. This is considered to be attributable to a high crosslinking density, that is, a large amount of an acryl group of the crosslinking monomer. Also, the film formed of the composition of Comparative Example 2 exhibited sufficiently high transparency after photocuring but when moisture was absorbed, the aluminum hydroxide compound produced by hydrolysis aggregated and the film was whitened.

The invention claimed is:

1. A photocurable hygroscopic composition comprising:
   (a) a moisture-reactive organic metal compound,
   (b) a (meth)acrylate,
   (c) a carboxyl group-containing polymerizable monomer, and
   (d) a photopolymerization initiator,
   wherein the proportion of the moisture-reactive organic metal compound (a) is from 5 to 70 wt % based on the entire composition, and the proportion of the carboxyl group-containing polymerizable monomer (c) is from 0.1 to 50 mol % based on the moisture-reactive organic metal compound (a),
   wherein said moisture-reactive organic metal compound (a) is a metal alkoxide represented by the following formula:

$M(OR)_n$ 

wherein M is Al, B, Ti or Zr, R is an alkyl group, an alkenyl group, an aryl group, a cycloalkyl group, a heterocyclic group or an acyl group, and n is the valence of M.

2. The photocurable hygroscopic composition as claimed in claim 1, wherein said moisture-reactive organic metal compound (a) produces an alcohol ROH having a boiling point of 160° C. or more by a reaction with water.

3. The photocurable hygroscopic composition as claimed in claim 1, wherein said (meth)acrylate comprises either one or both of a mono(meth)acrylate and a polyfunctional(meth)

acrylate and in the case of containing said polyfunctional (meth)acrylate, the proportion of the polyfunctional(meth) acrylate is such an amount that the (meth)acryloyl group of the polyfunctional(meth)acrylate occupies 0.05 mol or less per 100 g of the entire composition.

4. The photocurable hygroscopic composition as claimed in claim 3, wherein said mono(meth)acrylate is an alkyl acrylate, an alkylene acrylate or an acrylamide.

5. The photocurable hygroscopic composition as claimed in claim 3, wherein said polyfunctional(meth)acrylate is an alkyl di(meth)acrylate, a polyether(meth)acrylate, a silicone di(meth)acrylate or an oligo(meth)acrylate.

6. A photocurable hygroscopic composition comprising:
(a) a moisture-reactive organic metal compound,
(b) a (meth)acrylate,
(c) a carboxyl group-containing polymerizable monomer, and
(d) a photopolymerization initiator,
wherein the proportion of the moisture-reactive organic metal compound (a) is from 5 to 70 wt % based on the entire composition, and the proportion of the carboxyl group-containing polymerizable monomer (c) is from 0.1 to 50 mol % based on the moisture-reactive organic metal compound (a),
wherein said carboxyl group-containing monomer is an acrylic acid, a methacrylic acid, a (meth)acryloylethyl phthalate, a (meth)acryloylethyl hexahydrophthalate, an ethylene oxide-modified succinic acid(meth)acrylate or a β-carboxyethyl(meth)acrylate.

7. A hygroscopic film formed by shaping the photocurable hygroscopic composition claimed in claim 1 or 6 into a film form, and curing the film.

8. An organic EL device comprising:
a stacked body obtained by interposing an organic light-emitting material layer comprising an organic material between a pair of electrodes opposing each other;
a structure for sealing said stacked body from the outer air, and
drying means disposed in said structure, wherein said drying means is formed of the photocurable hygroscopic composition claimed in claim 1 or 6.

* * * * *